Patented Jan. 14, 1947

2,414,394

UNITED STATES PATENT OFFICE 2,414,394

MANUFACTURE OF ARTICLES OF RUBBERLIKE MATERIAL

John S. Rumbold, Woodbridge, Conn., assignor to United States Rubber Company, New York, N. Y., a corporation of New Jersey No Drawing. Application October 2, 1942, Serial No. 460,537

11 Claims. (Cl. 18—58)

This invention relates to the manufacture of articles of rubber-like material, and more particularly to improving the tensile strength of articles directly deposited from aqueous dispersions of rubber-like copolymers of butadiene and other polymerizable materials, such as styrene or acrylic nitrile.

Synthetic rubber-like materials, or so-called artificial rubbers, which are copolymers of butadiene and another polymerizable material, such as a vinyl compound, e. g., styrene, alkyl styrene, acrylic nitrile, alkylacrylic nitrile, generally in the range of 40 to 90 parts of butadiene per 100 parts of the mixture of polymerizable materials, are known. When amounts of carbon black up to 50% or 60%, based on the weight of rubber or such rubber-like copolymers, are milled into natural rubber or such synthetic rubber-like materials with the usual compounding ingredients required for satisfactory vulcanizing, the physical properties of the final products after vulcanization are greatly improved. The tensile strength is increased and the products are found to be more durable, tougher, and more resistant to abrasion than similar products made without the addition of carbon black. The carbon black in these cases is generally introduced into the plasticized rubber or rubber-like material on the mill, as in common compounding practice and the plasticized mass vulcanized to final shape. It has been suggested to add carbon black and various compounding and vulcanizing ingredients to latex and to aqueous dispersions of the synthetic rubber-like copolymers, coagulate the solids of the dispersion to form a crude rubber or synthetic rubber containing the carbon black and other compounding ingredients, and dry at low temperatures. Such crude compounded rubbers and synthetic rubbers may then be shaped, as by molding, extruding, calendering, or the like, and vulcanized by heating at elevated temperatures. In these cases the carbon black has a so-called "reinforcing" effect and the tensile strength is increased and various other improvements are made in the properties of the rubber or rubber-like compound. However, when dispersions of carbon black are mixed into natural rubber latex and the compounded latex deposited directly in the desired shape, as by dipping, spreading, spraying, or the like process, to form directly the desired article without milling, molding, extruding, calendering, or otherwise masticating the rubber, the tensile strength of the directly deposited latex products is found to be decreased over the tensile strength of products made from similarly compounded latices but omitting the carbon black. In these cases the carbon black does not have a "reinforcing" effect, but has the opposite effect and acts very similarly to any inert filler or loading material in decreasing the tensile strength of the final product.

I have discovered that the addition of carbon black to an aqueous dispersion of a copolymer of butadiene and another polymerizable material, such as styrene or acrylic nitrile, will have a reinforcing effect and increase the tensile strength of an article deposited directly from such an artificial rubber dispersion. The article may be directly deposited from an aqueous dispersion of such synthetic rubber-like material containing the carbon black, and vulcanizing ingredients if desired, in any of the conventional ways of manufacturing articles directly from rubber latex, as for example, by dipping a form into the dispersion, or spraying the dispersion onto a form, or by spreading the dispersion on a belt or so-called blanket, if the article is to be a sheet, and drying, and vulcanizing, if desired. The deposition on a form may be speeded up, as in conventional rubber latex practices, by treating the form first with a coagulant for the dispersion, and then dipping into the dispersion of rubber-like material, or by dipping first in the dispersion, then coagulating the film by dipping the form into the coagulant, and again dipping in the dispersion and allowing the form to remain in the dispersion until the desired thickness of rubber-like material has been built up. These manipulative procedures for directly depositing rubber articles directly from latex are well known, and similar methods may be utilized in depositing articles directly from dispersions of these synthetic rubber-like materials.

The improvement in tensile strength of films deposited directly from aqueous dispersions of copolymers of butadiene and another polymerizable material by the addition of carbon black to the dispersion is illustrated in the following examples:

Example I

An aqueous dispersion of a copolymer of butadiene and styrene of 28% solids content and stabilized with 5 parts of "Emulphor-ON" (reaction product of oleyl alcohol and ethylene oxide), and 4 parts of "Nekal-A" (sodium isopropyl naphthalene sulphonate) per 100 parts of polymer, was creamed with ammonium alginate to 53% solids content and compounded as follows:

| | Parts by weight |
|---|---|
| Copolymer solids | 100 |
| Dimethylamine oleate (stabilizer) | 1.5 |
| Gelatin (stabilizer and thickener) | 1.6 |
| Sulphur | 2.5 |
| Zinc oxide | 5 |
| Zinc salt of mercaptobenzothiazole (vulcanization accelerator) | 2 |

To increase the degree of dispersion and prevent flocculating or coagulating, the sulphur, zinc oxide and zinc salt of mercaptobenzothiazole were added in the form of pebble-milled suspensions in water containing small amounts of commercial surface active agents. To various samples of the above compound were added different proportions of carbon black in the form or a pebble-milled dispersion in water containing a small amount of a surface active agent. Amounts of carbon black corresponding to 5, 10, 15, 20 and 25 parts of carbon black per 100 parts of copolymer solids were added to the various portions of the above artificial rubber dispersion compound. Films were spread on a backing, dried at room temperature, and vulcanized for various periods in air at 145° C. The maximum tensile strength in pounds per square inch of the copolymer containing the various amounts of carbon black are set forth in the table below:

| Percent carbon black based on copolymer solids | Maximum tensile strength, lbs. per sq. in. |
|---|---|
| None | 273 |
| 5 | 394 |
| 10 | 503 |
| 15 | 667 |
| 20 | 667 |
| 25 | 946 |

*Example II*

Another aqueous dispersion of a copolymer of butadiene and styrene of 36% solids content containing 5 parts of commercial soap per 100 parts of polymer as a stabilizer was compounded according to the following formulation in the manner described above in Example I.

| | Parts by weight |
|---|---|
| Copolymer solids | 100 |
| "Emulphor-ON" (stabilizer) | 1 |
| Sulphur | 2 |
| Zinc oxide | 5 |
| Zinc salt of mercaptobenzothiazole | 2 |

To various proportions of the above compound were added suspensions of carbon black in water containing small amounts of a surface active agent. Amounts of carbon black from 10 to 50 parts per 100 parts of copolymer solids were added in this way. Films were spread on a backing, from the various compounds and dried at room temperature, followed by vulcanization of the films in air for various periods at 135° C. Results of measurements of tensile strength of vulcanized films of thickness about .01 inch are tabulated below, the maximum tensile strength of each series being given:

| Percent carbon black based on the copolymer solids | Maximum tensile strength, lbs. per sq. in. |
|---|---|
| None | 272 |
| 10 | 576 |
| 20 | 1,070 |
| 30 | 1,655 |
| 40 | 1,590 |
| 50 | 1,640 |

*Example III*

In this case an aqueous dispersion of a copolymer of butadiene and acrylic nitrile of 50% solids content, containing between 5 and 10 parts of a soap-like material per 100 parts of polymer as a stabilizer was compounded according to the following formulation in the manner set forth in Example I:

| | Parts by weight |
|---|---|
| Copolymer solids | 100 |
| Dimethylamine (stabilizer) | 1 |
| Sulphur | 2 |
| Zinc oxide | 3 |
| Zinc salt of mercaptobenzothiazole | 2 |

Portions of the above compound were mixed with various amounts of a water dispersion of carbon black containing a small amount of surface active agent. Films were spread from the compounds, dried at room temperature, and vulcanized for various periods in air at 120° C. and 140° C. The results of tensile strength tests on the compounds is shown below:

| Percent carbon black based on the copolymer solids | Maximum tensile strength, lbs. per sq. in. |
|---|---|
| VULCANIZATION AT 120° C. | |
| None | 672 |
| 11 | 1,800 |
| 22 | 1,850 |
| 33 | 2,090 |
| VULCANIZATION AT 140° C. | |
| None | 518 |
| 11 | 1,720 |
| 22 | 1,980 |
| 33 | 2,360 |

From the above it may be seen that very definite improvements in tensile strength are imparted to articles deposited directly from aqueous dispersions of copolymers of butadiene and other polmerizable materials, such as styrene and acrylic nitrile, by the addition of carbon black. The reinforcing effect of the carbon black is very noticeable at 10% carbon black and higher. Films deposited from an aqueous dispersion of a copolymer of butadiene and styrene without the addition of carbon black can be vulcanized to tensile strengths of around 300 to 400 lbs. per square inch, which is too low for most practical purposes. By the addition of carbon black to the dispersion, the tensile strength of articles deposited directly from the dispersion can be raised to between 1000 and 2000 lbs. per square inch. This is shown in Examples I and II. As shown in Example III, films deposited from an aqueous dispersion of a copolymer of butadiene and acrylic nitrile, without the addition of carbon black, may be vulcanized to somewhat higher tensile strengths than films deposited directly from dispersions of the copolymer of butadiene and styrene, and in the case of copolymers of butadiene and acrylic nitrile, there is also a corresponding increase in the tensile strength on addition of carbon black to the dispersion. This increase in tensile strength of directly deposited articles by the addition of carbon black to the dispersion (of copolymer of butadiene and styrene or acrylic nitrile) is diametrically opposite to the effect of the addition of carbon black to natural rubber latex and the deposition of rubber articles directly from latices thus compounded. With natural rubber latex the carbon black decreases the tensile strength of a directly deposited rubber film and has only a loading or filler effect, as distinguished from the reinforcing effect which carbon black has on articles deposited directly from aqueous dispersions of copolymers of butadiene and other polymerizable materials, such as styrene and acrylic nitrile.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. Method of making articles of rubber-like materials which comprises directly depositing in the desired shape the solids of an aqueous dispersion of a copolymer of butadiene and another polymerizable material, said dispersion containing carbon black added to the copolymer dispersion, and drying.

2. Method of making articles of rubber-like material which comprises directly depositing in the desired shape the solids of an aqueous dispersion of a copolymer of butadiene and a vinyl compound, said dispersion containing carbon black added to the copolymer dispersion, and drying.

3. Method of making articles of rubber-like material which comprises directly depositing in the desired shape the solids of an aqueous dispersion of a copolymer of butadiene and another polymerizable material, said dispersion containing at least 10 parts of carbon black added to the copolymer dispersion per hundred parts of copolymer, and drying.

4. Method of making articles of rubber-like material which comprises directly depositing in the desired shape the solids of an aqueous dispersion of a copolymer of butadiene and a vinyl compound, said dispersion containing at least 10 parts of carbon black added to the copolymer dispersion per hundred parts of copolymer, and drying.

5. Method of making articles of rubber-like materials which comprises directly depositing in the desired shape the solids of an aqueous dispersion of a copolymer of butadiene and styrene, said dispersion containing carbon black added to the copolymer dispersion, and drying.

6. Method of making articles of rubber-like material which comprises directly depositing in the desired shape the solids of an aqueous dispersion of a copolymer of butadiene and styrene, said dispersion containing at least 10 parts of carbon black added to the copolymer dispersion per hundred parts of copolymer, and drying.

7. Method of making articles of rubber-like materials which comprises directly depositing in the desired shape the solids of an aqueous dispersion of a copolymer of butadiene and acrylic nitrile, said dispersion containing carbon black added to the copolymer dispersion, and drying.

8. Method of making articles of rubber-like material which comprises directly depositing in the desired shape the solids of an aqueous dispersion of a copolymer of butadiene and acrylic nitrile, said dispersion containing at least 10 parts of carbon black added to the copolymer dispersion per hundred parts of copolymer, and drying.

9. Method of making articles of rubber-like material which comprises directly depositing in the desired shape the solids of an aqueous dispersion of a copolymer of butadiene and a vinyl compound, said dispersion containing carbon black added to the copolymer dispersion and vulcanizing ingredients for said copolymer, and drying and vulcanizing.

10. Method of making articles of rubber-like material which comprises directly depositing in the desired shape the solids of an aqueous dispersion of a copolymer of butadiene and a vinyl compound, said dispersion containing vulcanizing ingredients for said copolymer and at least 10 parts of carbon black added to the copolymer dispersion per 100 parts of copolymer, and drying and vulcanizing.

11. Method of making articles of rubber-like material which comprises directly depositing in the desired shape the solids of an aqueous dispersion of a copolymer of butadiene and styrene, said dispersion containing vulcanizing ingredients for said copolymer and at least 10 parts of carbon black added to the copolymer dispersion per hundred parts of copolymer, drying and vulcanizing.

JOHN S. RUMBOLD.